March 8, 1966

V. J. JANDASEK 3,238,726

TRANSMISSION

Filed Nov. 13, 1962

VLADIMIR J.
JANDASEK
INVENTOR.

BY John R. Faulkner
Robert E. McCollum
ATTORNEYS

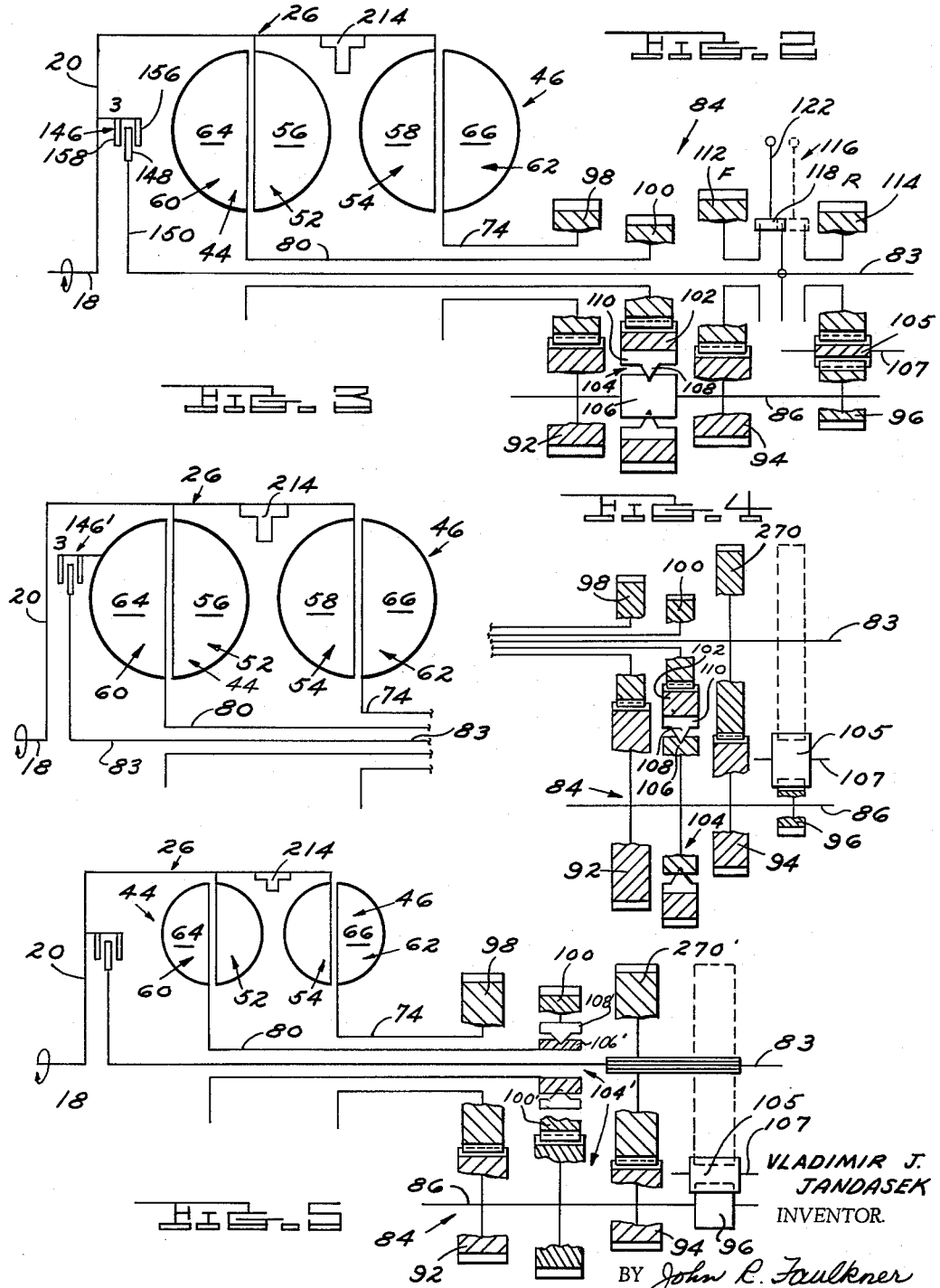

United States Patent Office 3,238,726
Patented Mar. 8, 1966

3,238,726
TRANSMISSION
Vladimir J. Jandasek, Dearborn, Mich., assignor to Ford Motor Company, Dearborn, Mich., a corporation of Delaware
Filed Nov. 13, 1962, Ser. No. 237,032
3 Claims. (Cl. 60—54)

This invention relates to an automatic transmission construction. More particularly, it relates to a transmission having a plurality of fluid couplings combined with a counter-shaft type gear train to produce three forward drive speed ratios, neutral, hill braking, and two reverse drive speed ratios.

It is an object of the invention to provide a transmission having a pair of back-to-back fluid couplings of the fill and empty type combined with countershaft type gearing in such a manner that progressive upward changes in the reduction drive speed ratios may be obtained by progressively and cumulatively filling the couplings, an overrunning mechanism associated with the gearing automatically terminating one drive and establishing a second.

It is a further object of the invention to provide a transmission construction utilizing a reduction drive gear train to establish various speed ranges, and one having synchronized shifts between forward and reverse operation. This enables a smooth change to be made in the direction of rotation of the transmission output shaft without clashing of gear teeth and eliminates a complete stoppage of the various power shafts in order to engage the selected gears.

It is another object of the invention to provide a transmission construction of the type described having clutch means directly connecting the power input and output shafts to establish a drive range bypassing the hydrodynamic drive devices and reduction gear train.

It is also an object of the invention to provide a transmission construction of the type described having clutch means between one of a plurality of hydrodynamic drive devices and the transmission power output shaft to establish substantially a direct drive thereto from the power input shaft bypassing the reduction drive gear train.

It is a still further object of the invention to provide a transmission having a reduction drive gear train wherein forward and reverse drive is obtained by the use of a gear slidably mounted on the power output shaft for engagement with forwardly or reversely rotating gear members.

An object of the invention is also to provide a dual fluid coupling transmission wherein the couplings are each of the fill and empty type including fluid exhaust valves circumferentially spaced from each other in the same radial plane between the joined impellers of the couplings.

Another object of the invention is to provide a transmission having a fluid coupling of the fill and empty type with an air vent valve for restrictively exhausting the air from the coupling as it is filled with operating fluid, and operable in response to the attainment of a substantially filled coupling condition to limit or block further flow of air or operating fluid through the restriction.

The invention also has for its object to provide a transmission having a pair of back-to-back fluid couplings of the fill and empty type having a number of air vent valves located in the same radial plane and circumferentially spaced from each other.

It is also an object of the invention to provide a three-speed automatic transmission that is economical to manufacture, is easily assembled and disassembled, and requires a minimum of fluid pressure actuated controls to provide the various drive ranges.

Other objects, features and advantages of the invention will become apparent upon reference to the succeeding detailed description thereof and to the drawings illustrating the preferred embodiments thereof, wherein:

FIGURE 2 is a schematic illustration of the transmission of FIGURE 1;

Figure 1:
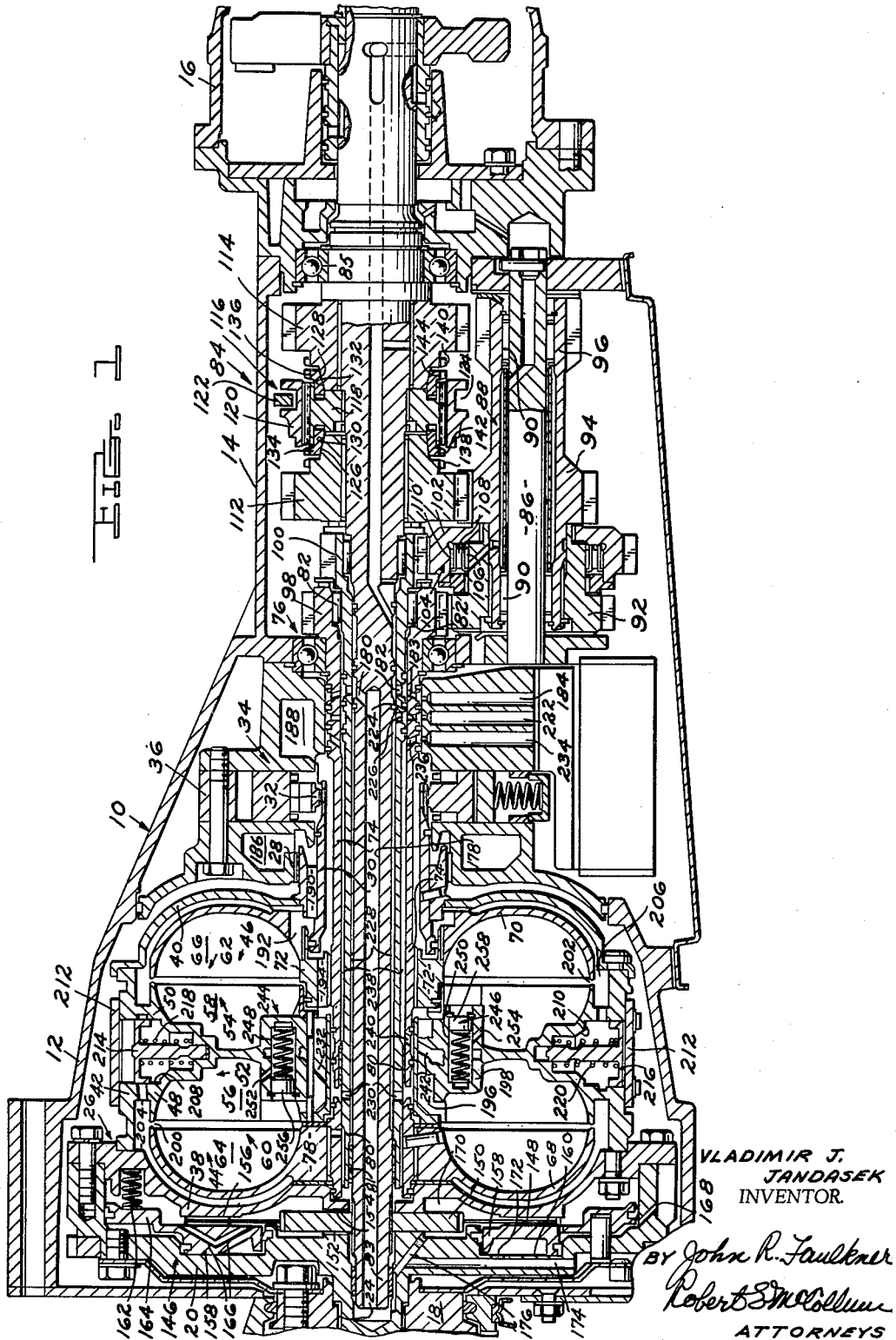
FIGURE 1 is a cross-sectional view of one transmission embodying the invention.

FIGURE 3 and 4 are schematic illustrations of modifications of portions of the transmission of FIGURES 1 and 2; and, FIGURE 5 is a schematic illustration of another modification of the transmission of FIGURES 1 and 2.

FIGURES 1 and 2 show one form of a transmission embodying the invention, FIGURE 1 being essentially to scale and showing the specific details of construction. As best seen in FIGURE 1, the transmission has a three-piece casing or housing 10 consisting of a forward bell-shaped section 12, a cylindrical intermediate section 14, and a conical tail shaft section 16. The forward section receives along its axis the terminal portion of a power drive shaft 18. The shaft is secured to a flywheel 20 having a hub portion 22 piloted in a recess 24 in the shaft. The flywheel is bolted to one edge of an annular fluid coupling shell 26 rotatably mounted within the casing on a sleeve bearing 28. The shell is connected at its rearward edge by a sleeve shaft 30 to the rotor 32 of a fluid pressure pump 34. The pump is of a known variable capacity type operating within a stationary housing 36 secured to the transmission casing and providing fluid under varying pressure to a control system (not shown) for a purpose to be described later.

The coupling shell 26 has two axially spaced semi-toroidal portions 38 and 40, and a main body portion 42 bolted together for rotation as a unit. The shell defines an outer housing or casing for two fluid couplings 44 and 46 of the fill and empty type. The main shell portion is cast or otherwise shaped to form integral back-to-back semi-toroidal shrouds 48 and 50 for the impeller members 52 and 54 of couplings 44 and 46, the shrouds each having a row of blades 56 and 58 secured within them. The outwardly facing impellers each face a correspondingly shaped turbine member 60 and 62 having blades 64 and 66 secured within shrouds 68 and 70.

The hub 72 of turbine member 62 is splined to one end of a sleeve shaft 74 rotatably supported at its other end on the casing by means of a bearing 76. The hub 78 of turbine member 60 is similarly secured to one end of a sleeve shaft 80 rotatably supported at opposite ends within shaft 74 by bearing members 81 and 82. The sleeve shafts surround and support the forward end of the transmission power output or driven shaft 83 through suitable bearing members as shown, and are connected selectively to the shaft by means of a reduction drive gear train 84. The rear portion of shaft 83 is supported on the casing by a bearing 85.

The gear train includes a countershaft 86 fixed in the transmission housing and rotatably supporting a cluster gear assembly 88 by means of bearings 90. The cluster gear has gears 92, 94, and 96, the gear 92 meshing with a gear 98 formed on the end of sleeve shaft 74. The sleeve shaft 80 also has a gear 100 formed on it, meshing with a gear 102 connected to the cluster gear assembly through a mechanical one-way overrunning clutch 104.

Clutch 104 is of a known mechanical type having an inner race 106 secured to the hub of gear 92 and separated by sprags or rollers 108 from an outer race sleeve 110 fixed to gear 102. The clutch locks up in a known manner to provide a drive of the cluster gear in a counterclockwise direction by gear 100 while permitting overrun of the cluster assembly upon faster counterclockwise rotation by gear 98.

The cluster gear assembly drives the output or driven shaft 83 alternately through two gears 112 and 114. The gears are rotatably mounted on shaft 83 and axially fixed as shown, gear 112 meshing with gear 94, while gear 114 constantly meshes with an idler gear 105 engaging gear 96. The idler gear is rotatably mounted on a shaft 107 parallel to countershaft 86 supported in the transmission casing.

The gears 112 and 114 are selectively clutched to shaft 83 by a synchronizer 116 having a hub 118 splined to the shaft. An axially movable clutch sleeve 120 is splined to the outer periphery of the hub and is movable axially by a shifter fork 122 engaging a groove 124. The gears 112 and 114 are formed with external conical friction surfaces 126 and 128 for cooperation with the internal conical surfaces 130 and 132 of blocker elements 134 and 136 rotatably mounted thereon. The blocker elements function in a known manner to establish synchronism between shaft 83 and gears 112 and 114 when an axial force is applied to the blocker elements by a thrust bar (not shown) upon movement of sleeve 120 in a direction to engage the gears. Once synchronism has been established, the synchronizer sleeve can be clutched to the respective gears by the engagement of its internal splines with clutch teeth 138, 140 and 142, 144 formed on the gear and blocker elements, respectively.

As is apparent, forward reduction drives of output shaft 83 are obtained by clutching gear 112 to shaft 83, while reverse reduction drives are established by clutching the shaft and gear 114.

A direct drive from power input shaft 18 to output shaft 83 bypassing the fluid couplings and reduction drive gear train may also be established by the actuation of a friction disc clutch 146 connecting the opposite end of shaft 83 to the flywheel 20. The driven portion of clutch 146 consists of an annular friction disc 148 splined to a flange 150 on driven shaft 83. The flange is rotatably mounted between shell portion 38 and flywheel 20 by thrust washers 152 and 154. The disc 148 is positioned between a flat friction surface 156 machined on the shell portion 38 and an annular piston 158 slidably and sealingly received in a channel 160 in the flywheel.

The clutch is normally maintained disengaged by a spring 162 between the shell 26 and a radial extension 164 of the piston. Fluid relief bores 166 and 168 provide a vent of any fluid present in the chamber 170 defined between the shell and piston. The clutch is engaged by fluid pressure from pump 34 admitted to the channel 160 through ports 172, connecting bores 174 and 176 in the flywheel, a longitudinal bore 178 through the driven shaft 83, and bores 180, 182, 183, and 184 leading from the fluid pressure control system, not shown.

The reduction drive gear train is conditioned for operation by the selective control of the fluid couplings 44 and 46 which are of the fill or empty type; that is, each is capable of being filled or emptied of fluid to control the transmission or torque from the driving shell 26 to the respective sleeve shafts 74 and 80.

The couplings are filled with operating fluid from main supply chambers 186 and 188 connected to the output of pump 34 through a fluid pressure control system (not shown). Chamber 186 supplies fluid under pressure to coupling 46 through bores 190 and 192 in sleeve shaft 30 and the hub 72 of turbine member 62, while chamber 188 supplies coupling 44 with fluid under pressure through the space between sleeve shafts 30 and 74 and bores 194 and 196 in the hub 198 of shell portion 42.

Each of the couplings discharges its fluid through the space 200, 202 between the outer peripheral portions of the impeller and turbine shrouds into a separate axially extending passage 204, 206 in shell portion 42. The passages communicate at their opposite ends with separate radial bores 208, 210 in the shell section. The radial bores are open at their inner ends to a fluid pressure vent line (not shown), and closed at their outer ends by an annular cover plate 212. A piston valve 214, 216 is slidably mounted within each bore and moves from a position blocking the exhaust of fluid from the respective coupling, as seen at the top half of FIGURE 1, to a position connecting the fluid in the coupling to the vent line, as shown on the bottom half of FIGURE 1.

The valves are biased to an open position by springs 218, 220, although centrifugal force acting on the mass of each rotating valve is generally sufficient to maintain it in an open position in the absence of counteracting forces. The valves are moved to a closed position by fluid pressure admitted to act on the top of the valves through suitable lines connected to the fluid pressure control system. For example, signal pressure is directed to the top of coupling vent valve 214 through a bore 222 in the valve casing, connecting bores 224 and 226 in sleeve shafts 74 and 80, along the space 228 between shafts 83 and 80, a bore 230, and a bore 232 (only partially shown) leading to the top of the valve. Similarly, signal pressure is directed to vent valve 216 from a bore 234, a bore 236 in sleeve shaft 74, the space 238 between shafts 74 and 80, a further bore 240 in shaft 80, and a bore 242 in shell portion 42 leading to the top of the valve.

The couplings are also provided with air and fluid vent valves 244, 246 at their hubs which permit the air displaced by the operating fluid to escape as the coupling fills. The common hub for the impeller members has a number of spaced bores 248, 250 each open at one end to the fluid in the coupling with which it is associated, and connected at its opposite end to a vent line (not shown). Each of the bores is intersected by a metered or orificed passage 252, 254 open to the coupling fluid chamber. Piston valves 256, 258 are slidably movable in the bores, and are spring biased to a position against a snap ring as shown, which position is beyond the metered opening but blocks the free passage of fluid through the bore.

Thus, as each coupling fills, the fluid will flow to the outer diameter of the coupling, and the air displaced inwardly will discharge through the respective orifice. When the level of operating fluid contacts the piston valve 256 or 258, it will move against the spring to shut the orifice 252 or 254 and prevent loss of fluid from the coupling. If it is desired to maintain a constant drain of fluid through the couplings during operation, to prevent over-heating, for example, an additional small orifice (not shown) bypassing the vent valve at all times could be provided.

In operation, Neutral is established by moving synchronizer sleeve 120 to a neutral position between gears 112 and 114, disengaging clutch 146, and emptying couplings 44 and 46. No drive will therefore be transmitted from shaft 18 to shaft 83.

First or Low Forward speed drive is established by moving synchronizer sleeve 120 to engage gear 112, and filling coupling 44 from supply chamber 188 while simultaneously directing fluid through signal line 232 to move vent valve 214 to a closed position. Clutch 146 remains disengaged, and coupling 46 emptied. Accordingly, forward or clockwise rotation of input shaft 18, as seen from the left of FIGURE 1, rotates impeller 52 forwardly to rotate turbine 60, sleeve shaft 80, and gear 100 forwardly and gear 102 rearwardly. One-way clutch 104 therefore locks up, rotating cluster gear 94 counter-clockwise to drive gear 112 and the driven shaft 83 forwardly at a speed reduced from that of the speed of drive shaft 18.

Second or Intermediate forward speed is established by maintaining the same connections as for the establishment of low speed, and additionally filling coupling 46 from supply chamber 186 while directing signal pressure from line 234 to move the coupling vent valve 216 to a closed position. Accordingly, forward rotation of input shaft 18 rotates the coupling members forwardly to rotate sleeve shafts 74 and 80 forwardly. Since gear 98 drives cluster gear 92 reversely or counterclockwise faster than the cluster gear assembly is being driven by gear 100 and clutch 104, the cluster gear overruns one-way clutch 104 releasing it. Cluster gear 94 therefore drives gear 112 and output shaft 83 at an intermediate forward speed, the coupling 44 and sleeve shaft 80 contributing no drive at this time.

Hill or coast braking is established in this speed range by the coupling 46. That is, faster forward rotation of output shaft 83 drives gear 112 forwardly to rotate the cluster gear assembly rearwardly, which maintains the one-way clutch 104 released. However, the direct engagement of cluster gear 92 with gear 98 on sleeve shaft 74 causes turbine 62 and impeller 54 to attempt to rotate forwardly faster than the impeller is being driven by shaft 18, thereby providing an engine braking effect.

A Direct drive is established by engaging clutch 146 by supplying fluid to act on piston 158, and emptying coupling 46 by releasing the signal pressure from line 234 and terminating the supply from chamber 186. Coupling 44 remains filled. A forward rotation of input shaft 18 drives output shaft 83 at the same speed, the faster rotation of the cluster gear assembly releasing the one-way clutch 104 to permit idle rotation of the coupling 44 and its associated sleeve shaft 80 and gear 100.

A first Reverse drive is established by moving synchronizer sleeve 120 to engage gear 114, and filling coupling 44 in the manner previoulsy described. Clutch 146 is disengaged and coupling 46 is empty. Accordingly, forward rotation of drive shaft 18 rotates turbine 60 and its associated sleeve shaft 74 and gear 100 forwardly to lock up one-way clutch 104 and drive the cluster gear assembly rearwardly. The reverse idler gear 105 (FIGURE 2) is therefore driven forwardly to rotate gear 114 and shaft 83 in a counterclockwise or reverse direction. This causes output shaft 83 to be driven in a reverse direction at a speed reduced from that of the drive shaft.

The use of the synchronizer 116 for changes from a forward to reverse drive permits the change to be made smoothly even though coupling 44 may already have been filled and the output gears 112 and 114 rotating, such as would be the case, for instance, if a low forward speed drive were already established, and a reverse drive were desired. The synchronizer, therefore, eliminates the need for braking apparatus to completely stop the rotation of the gears to be engaged before the change could be made.

A second or intermediate reverse reduction drive is established by additionally filling coupling 46, with the output shaft connected to gear 114, and clutch 146 disengaged. The cluster gear assembly is thereby driven at a faster rate in a reverse direction than it is being driven by coupling 44 and gears 100 and 102. Accordingly, one-way clutch 104 releases, terminating the drive from fluid coupling 44 and gear 100. Output shaft 83 is therefore driven in a reverse direction at a faster speed.

While FIGURES 1 and 2 show a direct drive from the drive to the driven shafts by means of clutch 146, a substantially direct drive through the hydraulic system can be provided, if desired. Such a construction is shown in FIGURE 3 where clutch 146′ is connected between turbine 60 and the output or driven shaft 83.

In all other respects, however, the details of construction remain the same, and a repetition of their description and operation is not given.

FIGURE 4 shows another modification of the FIGURE 1 transmission wherein the synchronized forward and reverse gear construction 112, 114, and 116 is replaced by a gear 270 slidably mounted upon the output shaft 83 for movement between the full and dotted line positions to engage the respective cluster gears to establish forward or reverse drive. As in connection with FIGURE 3, the other details of construction and operation remain the same as that in FIGURES 1 and 2, and therefore will not be repeated.

FIGURE 5 shows still another modification. This transmission is again similar to that illustrated in FIGURES 1 and 2, and differs therefrom only in the specific connection of the gear 100 to the reduction drive gear train, and the use of a gear 270 slidably mounted on the output shaft 83 to provide a forward or reverse drive thereof instead of a synchronizer between two gears. In this form, the sleeve 80 has the inner race 106′ of one-way clutch 104′ secured to it, the outer sleeve race 108′ being secured within the gear 100.

The forward and reverse directional control is established by the gear 270′ in the same manner as shown and described in connection with FIGURE 4. In all other respects, the details of construction and operation remain the same as in the FIGURES 1 and 2 showing, i.e., the overdriving of the clutter gear assembly upon filling of the intermediate coupling 46 releases the one-way driving connection between the low speed coupling 44 and the cluster gear assembly to permit the intermediate speed ratio to be established with the low speed coupling drive terminated.

While the invention has been illustrated in its preferred embodiments in the drawings, it will be clear to those skilled in the arts to which the invention pertains that many changes and modifications may be made thereto without departing from the scope of the invention.

I claim:

1. A hydrodynamic torque transmitting means comprising, a fluid coupling capable of being filled and emptied of liquid and having rotatable pump and turbine members together defining a liquid chamber, said coupling having liquid inlet and outlet ports, means to close said outlet port, and metering means venting the air from said coupling during filling of said coupling with liquid, one of said members having an axially extending bore therein adjacent its inner diameter communicating at one end with an exhaust duct and at its opposite end with the liquid chamber, said bore containing an axially movable piston blocking the said opposite end, means normally biasing said piston to the said bore opposite end, said metering means including a metered port connecting said bore and said chamber bypassing said piston in its normal position to vent the air from said chamber, the attainment of a predetermined pressure of liquid acting against said piston mvoing it to a position to close said metered port preventing egress of liquid from said coupling through said port.

2. A hydrodynamic torque transmitting means comprising, a fluid coupling capable of being filled and emptied of liquid and having rotatable pump and turbine members together defining a liquid chamber for the circulation of liquid therein, said coupling having liquid inlet and outlet ports adjacent its inner and outer peripheral portions respectively, means to close said outlet port, and a fluid metering assembly adjacent the said inner peripheral portion to vent the air from said coupling during filling of said coupling with liquid, said metering assembly including an axially extending bore in one of said members open at opposite ends and communicating at one end with the fluid in said chamber and at its opposite end with an exhaust passage, an axially movable piston acted upon and moved by the chamber liquid and sealingly positioned in said bore to block the flow of liquid through the bore, means biasing said piston to its blocking position, and a fluid orifice between said bore and said chamber bypassing said piston, the filling of said coupling forcing air contained therein through said orifice exhausting the same, said piston being moved by a predetermined pressure of the chamber liquid acting thereagainst to a position blocking said orifice in response to a substantially filled condition of said coupling to prevent further egress of air and liquid through said orifice.

3. A hydrodynamic torque transmitting means comprising, a pair of fluid couplings capable of being filled and emptied of operating liquid and each having rotatable pump and turbine members, said pump members being formed as a unit in back-to-back relation between said turbine members, said couplings each having liquid inlet and outlet ports, means to close said outlet ports, and fluid metering means circumferentially spaced in the same radial plane and associated with said couplings to vent air from said couplings during filling of said couplings with liquid, said metering means each including an axially extending bore having liquid and air inlets at one end in parallel to said bore and an exhaust opening at the opposite end of said bore, said air inlet comprising a restricted passage communicating at one end with the operating liquid and air in the couplings associated therewith and at its oppoiste end with said bore, and valve means normally biased towards one end of said bore and blocking the liquid inlet thereto, said valve means being movable in said bore in response to a predetermined pressure of liquid thereagainst indicative of the level of liquid in said coupling to block said restricted passage upon the attainment of a substantially filled condition of the said coupling associated therewith to prevent further egress of fluid through said restricted passage.

References Cited by the Examiner

UNITED STATES PATENTS

| | | | |
|---|---|---|---|
| 1,987,985 | 1/1935 | Bauer et al. | 60—54 |
| 2,003,212 | 5/1935 | Millican et al. | 74—330 |
| 2,058,802 | 10/1936 | Kamper | 74—330 |
| 2,150,151 | 3/1939 | Burrows et al. | 74—330 X |
| 2,184,941 | 12/1939 | Maroto | 74—330 |
| 2,343,786 | 3/1944 | Martin | 60—54 |
| 2,491,483 | 12/1949 | Dolza et al. | 60—54 |
| 2,521,117 | 9/1950 | Du Bois et al. | 60—54 |
| 2,550,055 | 4/1951 | Flinn | 74—732 X |
| 2,674,905 | 4/1954 | O'Brien | 74—732 X |
| 2,797,780 | 7/1957 | Wemp | 74—732 X |
| 2,898,738 | 8/1959 | Sand et al. | 60—54 |
| 2,902,044 | 9/1959 | Sherer et al. | 137—199 |
| 2,995,897 | 8/1961 | Parrish et al. | 74—732 X |
| 3,106,102 | 10/1963 | Clements | 74—330 X |

FOREIGN PATENTS 968,820   5/1950   France.

JULIUS E. WEST, *Primary Examiner.*

DON A. WAITE, *Examiner.*